United States Patent [19]

Thompson

[11] Patent Number: 4,604,834
[45] Date of Patent: Aug. 12, 1986

[54] METHOD AND APPARATUS FOR OPTIMIZING GRINDING

[75] Inventor: Robert A. Thompson, Quaker Street, N.Y.

[73] Assignee: General Electric Company, Schenectady, N.Y.

[21] Appl. No.: 783,599

[22] Filed: Oct. 3, 1985

[51] Int. Cl.[4] ............................................. B24B 49/02
[52] U.S. Cl. .............................. 51/165.71; 51/165.77; 51/165 R; 51/105 R; 51/289 R; 364/474; 409/141; 82/DIG. 9
[58] Field of Search .......... 409/141; 82/2 B, DIG. 9; 364/474; 51/165.77, 165 R, 165.71, 168, 169, 105 R, 289 R

[56] References Cited

U.S. PATENT DOCUMENTS

| | | | |
|---|---|---|---|
| 3,178,861 | 4/1965 | Milias | 51/165 |
| 3,473,435 | 10/1969 | Tse | 51/165 R |
| 3,829,750 | 8/1974 | Centner et al. | 318/561 |
| 3,872,285 | 3/1975 | Shum | 409/141 |
| 3,967,515 | 7/1976 | Nachtigal et al. | |
| 4,163,346 | 8/1979 | Matson | 51/165.77 |
| 4,298,948 | 11/1981 | Davis | 364/603 |
| 4,456,960 | 6/1984 | Wakai | 364/474 |
| 4,461,125 | 7/1984 | Wuest | 51/165.88 |

OTHER PUBLICATIONS

Thompson, R. A., "On the Doubly Regenerative Stability of a Grinder: The Theory of Chatter Growth"; Proceedings of the Annual Winter Meeting of the ASME, PED vol. 12, pp. 393-405, Dec. 9-14, 1984.
Thompson, R. A., "On the Doubly Regenerative Stability of a Grinder: The Mathematical Analysis of Chatter Growth"; Proceedings of the Annual Winter Meeting of the ASME, PED vol. 12, pp. 407-423, Dec. 9-14, 1984.

Primary Examiner—Harold D. Whitehead
Attorney, Agent, or Firm—Paul R. Webb, II; James C. Davis, Jr.

[57] ABSTRACT

A cylindrical grinding process is controlled by measuring the precession of lobes about the grinding wheel and the workpiece and employing the measured lobe precessions to determine an exponential chatter growth index, which is a measure of the rate of growth of chatter and, accordingly, of the stability of the process. The wheel and workpiece rotational speeds are controlled to minimize the growth of chatter and to optimize the process.

20 Claims, 6 Drawing Figures

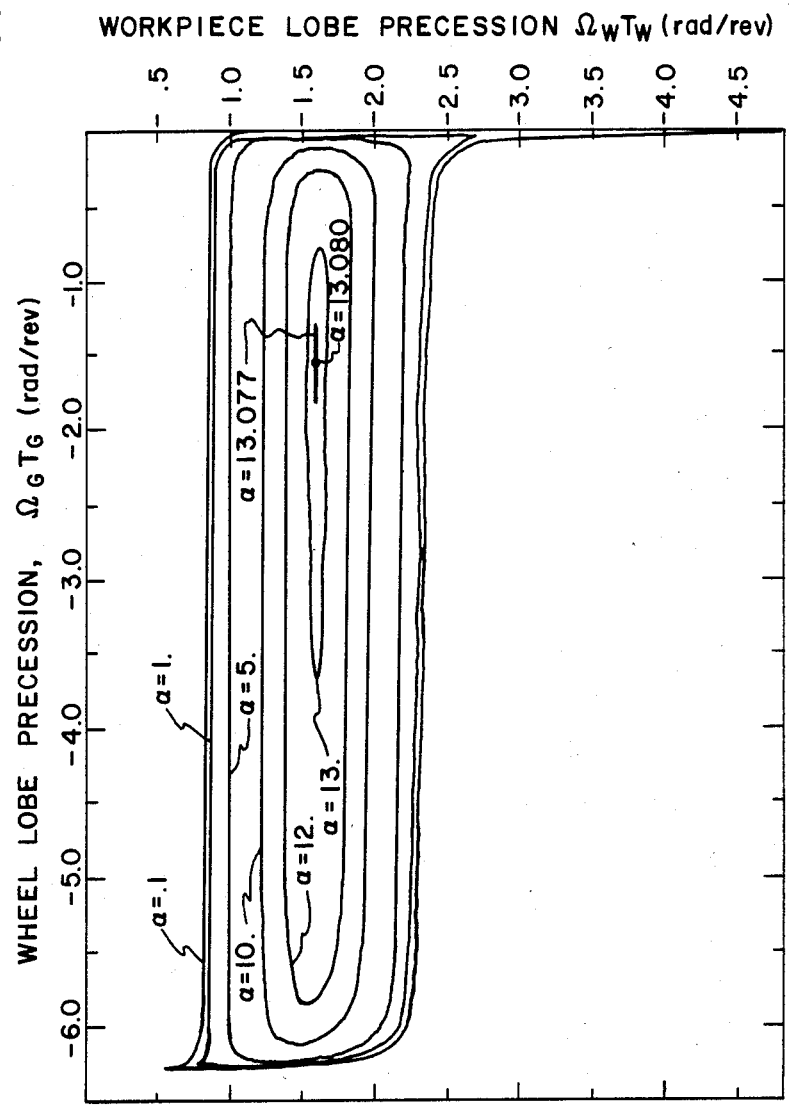

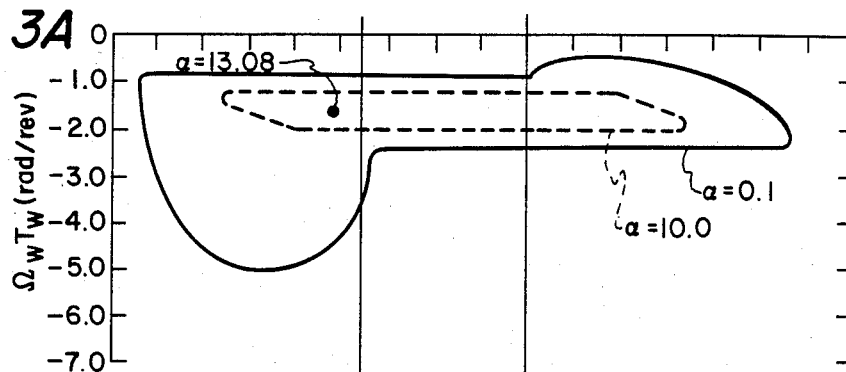
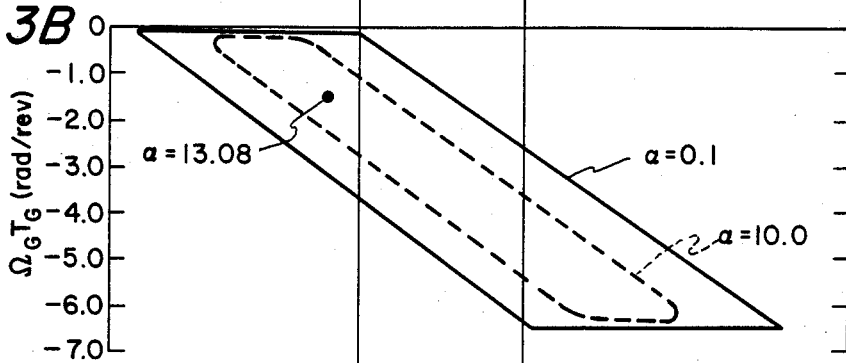
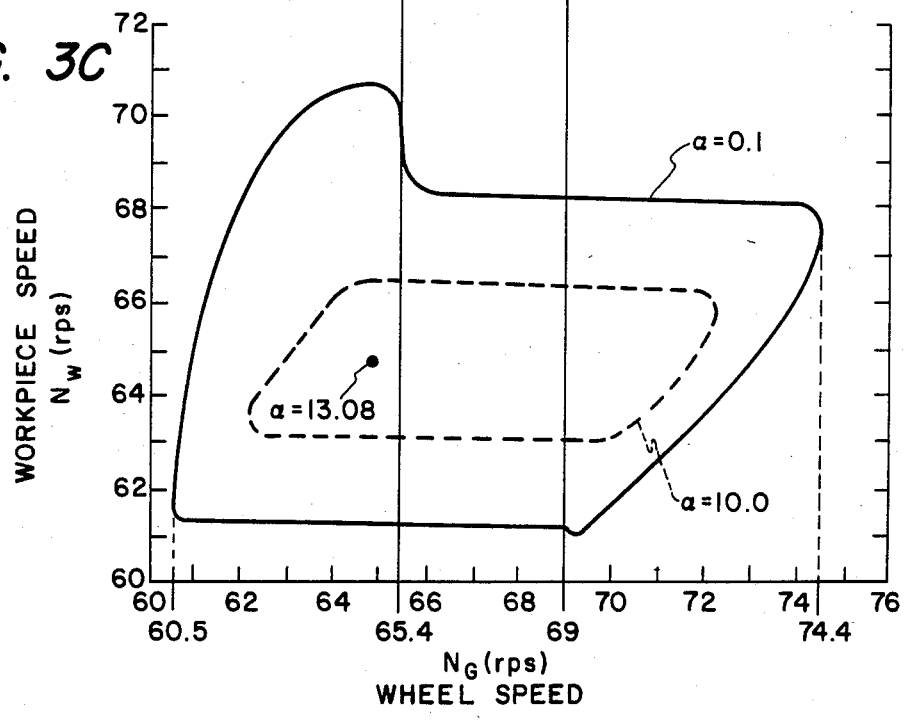

METHOD AND APPARATUS FOR OPTIMIZING GRINDING

BACKGROUND OF THE INVENTION

This invention relates generally to the control of machine tools and the like, and more particularly to a method and apparatus for monitoring and controlling a grinding process to optimize grinding productivity.

Although grinding processes possess a number of desirable features, including the ability to precision machine superalloys, they are difficult processes to control. The vibrational forces caused by the interaction of the grinding tool, i.e., wheel, and the workpiece are generally unstable and produce what is commonly referred to as regenerative chatter which grows or increases with time and eventually becomes unacceptable. Chatter is undesirable since it causes non-uniform relative motions between the workpiece and the grinding wheel at their interface and produces an undesirable non-uniform surface on the workpiece.

Although chatter is inevitable in a grinding process, chatter growth is a dynamic and complex phenomenon which is influenced by a number of factors such as the time-varying characteristics of the grinding machine and the cutting process, e.g., wheel loading. Therefore, the problem is not whether chatter will occur, but rather how it can be minimized and how the maximum allowable grinding time between dressings of the grinding wheel may be achieved. Because of the dynamic nature of the grinding process, it is impossible to set up fixed operating conditions which remain in a stable zone where chatter is minimized. Rather, in order to maintain optimum grinding conditions, it is necessary to monitor the grinding process and adaptively control the operating parameters. Although there have been a number of techniques proposed for accomplishing this, such as, for example, sensing the vibrations produced during grinding and varying the wheel loading in a predetermined manner in accordance with the vibrations, known techniques have not be entirely satisfactory. In part, this has been due to a rather poor understanding of the dynamic and complex nature of regenerative chatter.

It is desirable to afford a method and apparatus for dynamically monitoring and controlling a grinding process to minimize chatter and to maximize the allowable grinding time between dressings of the grinding tool. It is to this end that the present invention is directed.

SUMMARY OF THE INVENTION

The invention is based upon the discovery of a way of reliably predicting, parametrically in terms of wheel and workpiece speeds, the doubly regenerative growth of both wheel and workpiece chatter in a grinding process and a way of minimizing chatter growth by controlling the wheel and workpiece speeds. More particularly, it has been found that chatter growth depends upon an exponential growth index, which is a measure of the stability of the grinding process, and that the exponential growth index may be determined by measuring the lobe precession effect of the grinding wheel and workpiece. During grinding, lobes or surface waves form in the grinding wheel and workpiece such that the number of lobes times the rotational speed of the wheel or workpiece is near the dominant resonant frequency of the grinding machine system. The lobe precession effect is the phenomenon whereby these lobes or surface waves regenerate or change their positions relative to the wheel and workpiece each time they pass through the cutting zone. Once the exponential chatter growth index is known, the wheel and workpiece speeds may be controlled in a manner which minimizes chatter growth and optimizes the grinding process.

Briefly stated, the invention affords a method and an apparatus for optimizing a grinding process whereby the stability of the process is monitored by determining the chatter growth index from measurements of the grinding wheel lobe precession and the workpiece lobe precession. More specifically, the lobe precession of the wheel and the workpiece are respectively determined by measuring the wheel and workpiece rotational speeds, measuring the frequency of the vibrations associated with the grinding process, producing electrical signals corresponding to the measured values, and processing the electrical signals in a predetermined manner to determine separately the wheel and workpiece lobe precessions. The chatter growth index may be determined from tables of stored chatter growth index values corresponding to the measured lobe precessions.

Once the chatter growth index is known, the rotational speeds of the grinding wheel and the workpiece may be controlled in a predetermined manner which minimizes the growth index (and therefore minimizes chatter) and, accordingly, maximizes the allowable grinding time between wheel dressings.

BRIEF DESCRIPTION OF THE DRAWINGS

FIG. 2 is a plot of contours of constant chatter growth index versus wheel and workpiece lobe precession;

FIGS. 3A-C are contour plots of constant growth index illustrating, respectively, workpiece lobe precession, wheel lobe precession, and workpiece speed versus wheel speed;

DESCRIPTION OF THE PREFERRED EMBODIMENT

Figure 1:
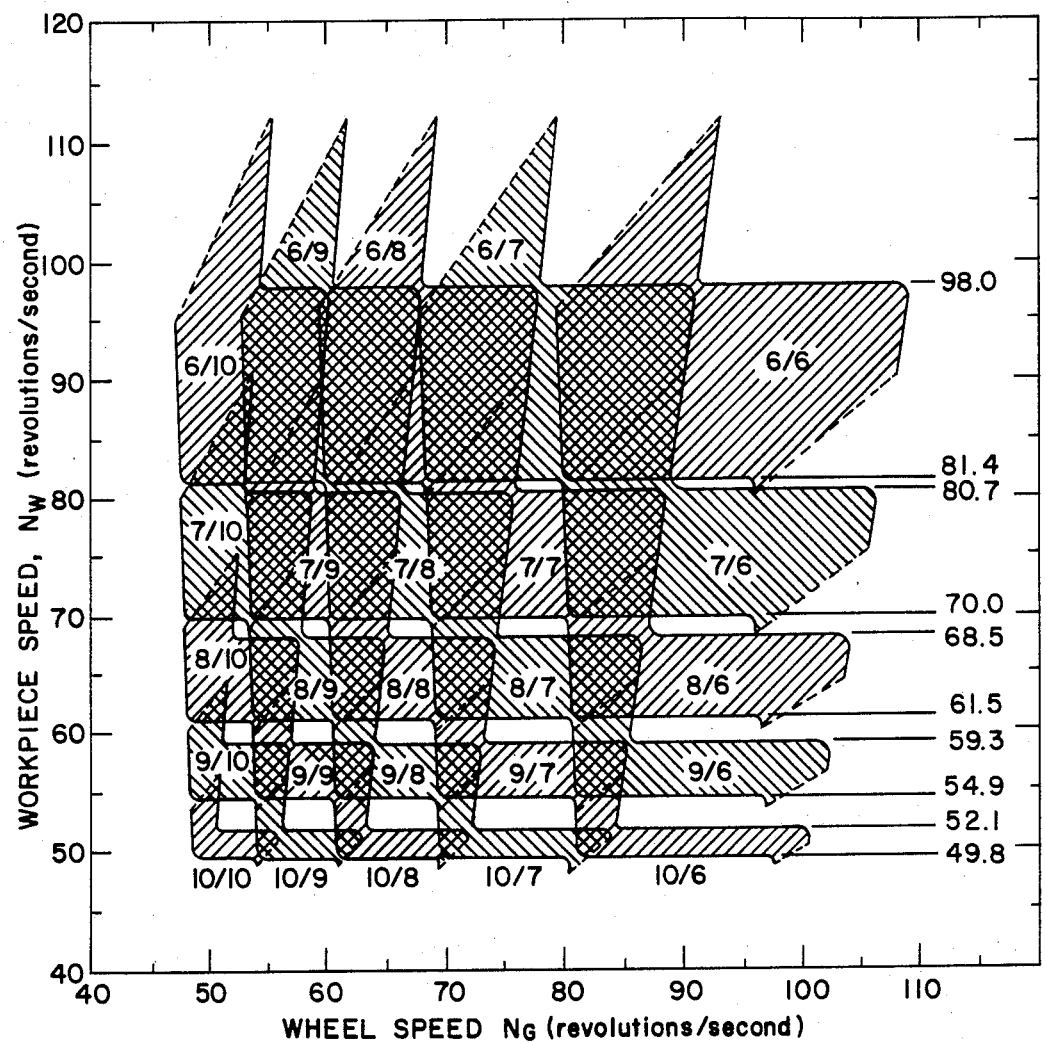
FIG. 1 is a plot which illustrates the chatter behavior of a typical cylindrical grinder versus wheel and workpiece speed.

The invention is particularly well adapted to monitoring and controlling a cylindrical grinding process of the type in which a rotating abrasive grinding wheel engages a rotating cylindrical workpiece to remove material therefrom and will be described in that context. As will become apparent, however, the principles of the invention are applicable to other types of grinding and machining processes.

Prior to describing the invention, it is appropriate to first consider its underlying principles since this will facilitate a better understanding of the invention from the description which follows. The invention is based upon the discovery of a new theory and analysis of regenerative chatter growth in grinders which is described in detail in two papers of inventor R. A. Thompson, entitled "On The Doubly Regenerative Stability of a Grinder: The Theory of Chatter Growth", and "On The Doubly Regenerative Stability of a Grinder: The Mathematical Analysis of Chatter Growth" which are included in the Proceedings of the Annual Winter Meeting of the ASME, PED Vol. 12, pp. 393-405 and 407-423, Dec. 9-14, 1984, the disclosures of which are incorporated by reference herein. In the analysis, chatter growth is allowed to vary exponentially with time in accordance with an exponential chatter growth index, $\alpha$, such that the magnitude of the grinding vibrations, both force and displacement, are given by $$x = A_o e^{\alpha t} \quad (1)$$

where x is the magnitude of the vibration, $A_o$ is the initial amplitude or noise, e is the natural logarithm base 2.71828, and t is the time. For example, if $\alpha=0.1$, $x/A_o=e^{0.1t}$ and in 10 seconds the chatter would grow by 2.72 times. In 100 seconds, it would grow by 22,000 times. This exponential growth behavior illustrates the need for detecting the value of the chatter growth index before x, the chatter amplitude, has a chance to grow significantly.

From the assumption of Equation (1) and the dynamic equations which describe the behavior of a cylindrical grinder based upon its geometry, six transcendental equations have been derived which fully describe the growth behavior of double regenerative vibrations in terms of the exponential growth index and various parameters which characterize the dynamic and cutting characteristics of the grinding system. These equations are set forth in Appendix A hereto. The equations may be solved on a computer using a triple iteration approach, and Appendix B gives a FORTRAN computer program which may be employed for this purpose.

Although the exponential growth index, $\alpha$, cannot be measured directly, an easily measured alternative parameter which is related to $\alpha$ and which is rather insensitive to spurious effects that are not related to stability is the lobe precession effect. As previously stated, in a grinding process lobes form in both the rotating wheel and workpiece such that their number times the rotational speed of the rotating member is near to the dominant resonant frequency of the machine system. The lobe precession effect is the phenomenon whereby these lobes or waves on the surface of the rotating member change their position on the surface, i.e., regenerate, each time they pass through the cutting zone. The frequency, $\Omega$, (radians per second) at which the lobes precess is bounded by the limits $$-2\pi N < \Omega < 0 \quad (2)$$

where N is the rotational speed (revolutions per second) of the member. The lobe precession (in radians per revolution) is $\Omega T$, where T is the rotational period (1/N).

Since the numbers of lobes which form on the wheel ($n_G$) and on the workpiece ($n_W$) are respectively related to the wheel speed ($N_G$) and to the workpiece speed ($N_W$), it will be appreciated that the response of a grinder is characterized by the combined interaction of many wheel and workpiece lobe pairs. Moreover, associated with each individual lobe pair are contours of constant $\alpha$ which measure the growth rate of an instability for that lobe pair.

FIG. 1 illustrates the chatter response of a typical grinder system as a function of wheel speed and workpiece speed. The plot illustrates contours of $\alpha=0$ for individual lobe pairs of a grinder system having an aluminium oxide wheel where the ratio of the linear wear coefficients of the wheel to the workpiece is $K_G/K_W=0.01$. The plot is for a machine system having the following characteristics:

$$A = 533.71/N_W \quad (3)$$

$$2mK_W = 0.0001204/N_W (s^2)$$

$$c/2m = 124.99 \, (1/s)$$

$$K_W \alpha \, 1/N_W$$

where $\alpha$ in the last equation means "proportional to" and the parameters are as defined in Appendix A. The plots of FIGS. 2 and 3A-C are for the same machine and were produced using the equations of Appendix A and the parameters given by Equation (3). Similar plots may be produced for other machines using these equations and the measured parameters of the machine.

Referring to FIG. 1, each contour bounds an area of instability for a particular lobe pair ($n_W/n_G$), i.e., the crosshatched area identified as 7/6 corresponds to the area of instability for 7 workpiece lobes and 6 wheel lobes. Since the plot is for $\alpha=0$ contours, the uncrosshatched areas are stable or chatter free. Inside the crosshatched areas, $\alpha$ is greater than zero and the chatter growth rate increases with distance from the contour. The areas of instability for the lobe pairs are crosshatched in opposite directions for clarity, and the double crosshatched areas indicate areas of overlap between lobe pairs. In these areas, more than one lobe pair is unstable, and chatter of two different frequencies with a complex pattern of wheel lobing occurs. The broken lines indicate a transition from one lobe pair to another.

FIG. 1 illustrates why grinding processes, for all of their good features such as the ability to precision machine superalloys, are difficult processes to control. The uncrosshatched areas of the figure, which are the stable or chatter free zones, occupy only a very small part of the total speed domain. Moreover, since the stable zones move and change in size during grinding because of the changing dynamic character of the process, it is nearly impossible to establish fixed grinding conditions which remain within the stable zones. This illustrates the need for a control system which includes a stability sensor for monitoring the stability of the process so that the operating conditions may be appropriately controlled. The present invention affords a method and apparatus for accomplishing this, as will be described in more detail shortly.

FIG. 2 is another contour plot which illustrates contours of constant $\alpha$ plotted against lobe precession per revolution for the wheel and the workpiece for $n_G=n_W=8$, i.e., the 8/8 lobe pair. Similar plots may be constructed for the other lobe pairs shown in FIG. 1 using the equations of Appendix A. Although the figure shows contours for only a few values of stability between 0.1 and 13.08 (the maximum value of $\alpha$ for a climb cut), which is sufficient for illustrating the principles of the invention, coutours for other values of $\alpha$, both positive and negative, may be calculated from the equations and added to the plot. It is clear from the figure, that the chatter growth index may be readily ascertained by measuring the lobe precessions of the grinding wheel and workpiece. Although there are other ways of measuring stability, the lobe precession effect is easily observed and measured, as will be described in more detail shortly, and is a convenient way for determining stability.

FIG. 2 illustrates several important characteristics of doubly regenerative grinding vibrations. First, since the wheel is quite wear resistant (non-compliant) relative to the workpiece, vibrations due to the wheel tend to grow much more slowly than those due to the workpiece. This is shown by the fact that greater changes in wheel lobe precession than in workpiece lobe precession may occur without moving off of a particular contour. As noted earlier (see Equation (2)), the range of lobe precession angles is between 0 and $-2\pi$. The wheel's contribution to chatter is embodied principally in the spikes at the diagonal corners of the contours at $\Omega_G T_G = -2\pi$ and 0. For $\alpha = 1.0$, the spikes are quite small, indicating the near absence of wheel regeneration, and at $\alpha = 5.0$, they are gone.

Secondly, FIG. 2 illustrates that the contours for higher growth rates enclose smaller areas where the energy needed to drive them is available. The maximum value of $\alpha$, 13.08, is a point which occurs at the coordinates $\Omega_G T_G = -1.49$ and $\Omega_W T_W = -1.61$. Both of these precession rates are very near $-\pi/2$ radians, or the condition where the lobes shift 90° rearward as they pass through the cutting zone. Since the workpiece has a much greater wear coefficient than the wheel, it contributes a great deal more to the process. This is clearly illustrated in the figure, for example, by the $\alpha = 13.0$ contour which encompasses a very narrow workpiece lobe precession range while it covers a much wider wheel lobe precession range. These characteristics are also evident from FIGS. 3A–C, which will be described in more detail shortly. First, however, a method and apparatus for measuring lobe precession will be described.

Figure 4:
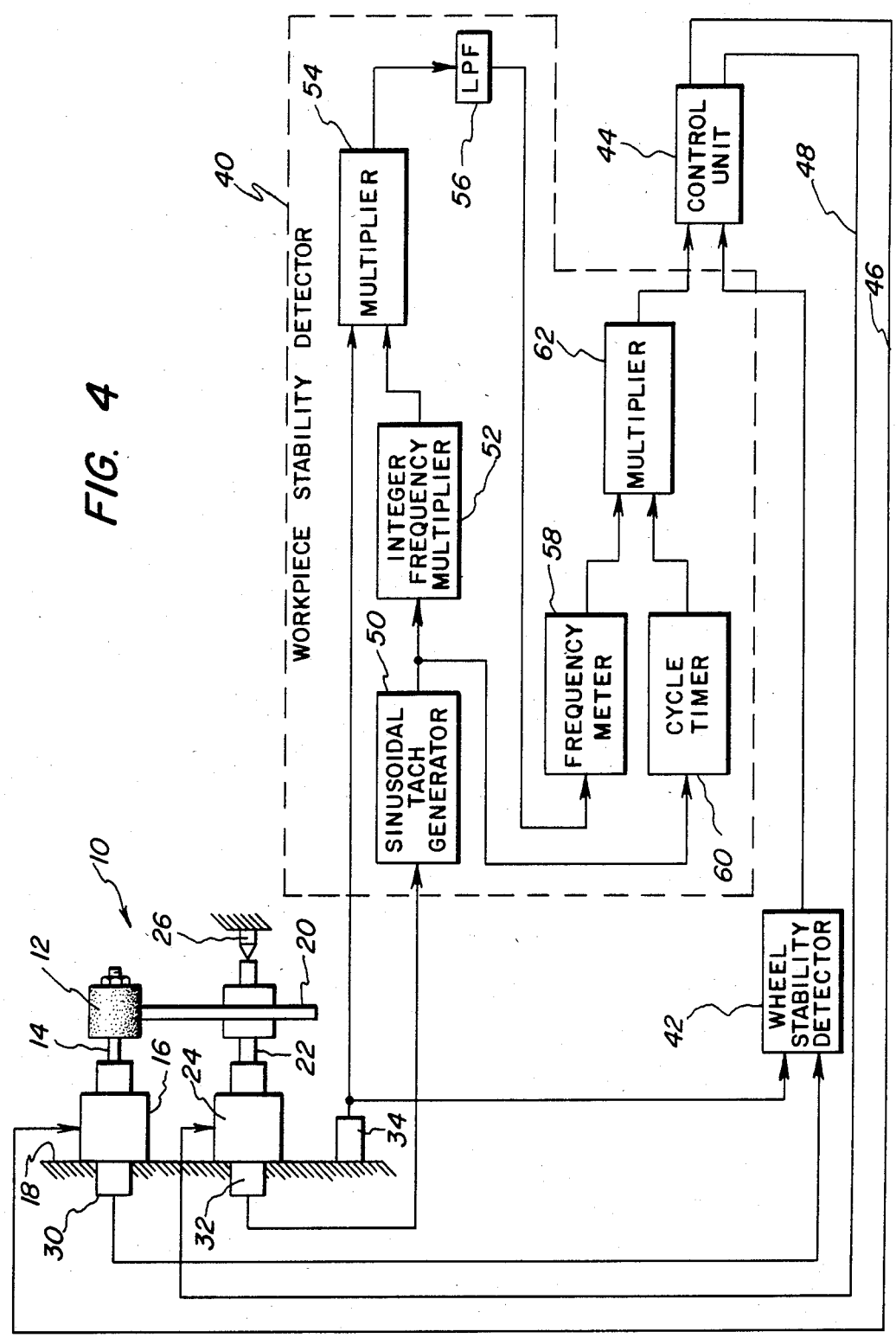
FIG. 4 is a block diagram illustrating a control system in accordance with the invention for monitoring and controlling a cylindrical grinding process.

FIG. 4 illustrates an apparatus in accordance with the invention for monitoring the stability of a cylindrical grinding process and for controlling the process to minimize chatter. As shown in the figure, the cylindrical grinding system 10 may comprise a rotating abrasive grinding wheel 12 carried on a spindle 14 driven by a motor 16 which is supported on a fixed base 18. A cylindrical workpiece 20 may be carried by another spindle 22 driven by a motor 24 which is supported on the base. The spindle may also be supported by a bearing 26. Not illustrated is a mechanism for producing relative motion between the grinding wheel and the workpiece to enable the grinding wheel to engage the workpiece with a preselected force.

Associated with the wheel spindle and the workpiece spindle are tachometer generators 30 and 32 which measure the rotational speeds of the wheel spindle and the workpiece spindle, respectively, and produce corresponding output signals. An accelerometer 34 may be mounted on base 18 to provide an output signal corresponding to the grinding vibrations. The output signal from tachometer generator 32 may be input to a workpiece stability detector 40, which will be described in more detail shortly, along with the output signal from accelerometer 34, and the output signals from tachometer generator 30 and accelerometer 34 may be supplied to a similar wheel stability detector 42. Stability detectors 40 and 42 measure the lobe precession per revolution of the workpiece and the wheel, respectively, and provide corresponding output signals to a control unit 44. The control unit determines the chatter growth index $\alpha$ from the measured lobe precessions, and feeds back speed control signals to the grinding wheel spindle drive motor and to the workpiece spindle drive motor via control lines 46 and 48, respectively. The speed control signals control the wheel and workpiece spindle speeds in such a manner that the grinding process operates in a zone which minimizes chatter. The manner in which the apparatus of FIG. 4 operates to accomplish this will now be described.

In accordance with the invention, the measurement of lobe precession is based upon the fact that the frequency, $\omega$, of the vibrations produced by a grinding process is the sum of the lobe or wave passing frequency, $\omega_0$, which is the number of lobes times the spindle speed, and the frequency of lobe precession, $\Omega$. This applies to both the wheel and workpiece. The frequency, $\omega$, of grinding vibrations is sensed by accelerometer 34 and may be expressed mathematically as $$\omega = 2\pi n N + \Omega \tag{4}$$

where n is the number of lobes, N is the spindle speed (rev/s), and $\Omega$ is the lobe precession frequency (rad/s). The voltage generated by the accelerometer is therefore of the form $$V_o = A \sin \omega t = A \sin (2\pi n N t + \Omega t) \tag{5}$$

where A is a constant.

The output signal from tachometer generator 32 may be converted to a signal having a frequency proportional to the measured rotational speed of the workpiece spindle by a sinusoidal tachometer generator 50, and the output signal from the generator 50 may be multiplied by an integer, $n_1$, in an integer frequency multiplier 52 to generate a signal $$V_1 = B \sin 2\pi n_1 N t \tag{6}$$

where B is a constant. The signals from the accelerometer and the integer frequency multiplier represented by Equations (5) and (6) may be multiplied together in a multiplier 54 to produce the result $$V_o V_1 = AB \sin (2\pi n N t + \Omega t) \sin (2\pi n_1 N t) \tag{7}$$

$$= \frac{AB}{2} [\cos [2\pi(n - n_1)Nt + \Omega t] -$$

$$\cos [2\pi(n + n_1)Nt + \Omega t]].$$

Preferably, the integer frequency multiplier 52 is variable so that the multiplier, $n_1$, may be set equal to n, the number of lobes. If this is done, Equation (7) reduces to $$V_o V_1 = \frac{AB}{2} [\cos \Omega t - \cos (4\pi n N t + \Omega t)]. \tag{8}$$

The first term of Equation (8) represents a sine wave having a frequency $\Omega$, while the second term represents a sine wave having a frequency of $4\pi n N + \Omega t$, which is approximately twice the frequency of grinding vibrations sensed by the accelerometer.

The signal from multiplier 54, represented by Equation (8), may next be supplied to a low pass filter 56 having its passband set at a frequency $2\pi N$ radians per second or N Hz so that the output from the filter is $$V_o V_1 = \frac{AB}{2} \cos \Omega t \tag{9}$$

This signal may be fed to a frequency meter 58 which accurately measures the lobe precession frequency, $\Omega$, and outputs a voltage corresponding thereto.

The output signal from the sinusoidal tachometer generator 50 may also be applied to a cycle timer 60 which measures the period of rotation $T=1/N$ of the spindle and outputs another voltage corresponding to the result. The voltages from frequency meter 58 and cycle timer 60 may be multiplied together in another multiplier 62 to produce the desired lobe precession per revolution $\Omega T$.

Stability detector 40 measures the workpiece lobe precession, $\Omega_W T_W$. Stability detector 42, which may be the same as stability detector 40, receives as inputs the wheel spindle speed from tachometer generator 30 and the frequency of grinding vibrations from accelerometer 34, processes these inputs in the same manner as described for the workpiece stability detector, and produces an output corresponding to the wheel lobe precession per revolution $\Omega_G T_G$. Detectors 40 and 42 may be readily implemented in either analog or digital hardware, digital hardware being preferred, or the foregoing process may be implemented in software in a computer.

As indicated in FIG. 2, once the values of wheel lobe precession and workpiece lobe precession are known, the value of the chatter growth index, $\alpha$, may be readily determined. This may be easily accomplished, for example, by storing in control unit 44 tables of growth index values as a function of various wheel and workpiece lobe precession values corresponding to plots similiar to that of FIG. 2 for the various lobe pairs. The lobe precession values produced by stability detectors 40 and 42 may then be used to enter an appropriate table to produce a corresponding value of growth index. Once the value of the chatter growth index is known, the control unit may produce speed control signals for the wheel and workpiece spindle motors to optimize the operating conditions of the grinding process. This may be accomplished in the following manner.

As previously discussed in reference to FIG. 1, in order to optimize the process, it is necessary to establish operating conditions that fall within the uncrosshatched areas of the plot. For example, the speeds $N_G=66.0$ and $N_W=69.2$ place the operating point in approximately the center of the stable region between the 8/8 and the $\frac{7}{8}$ lobe pairs. Because of the dynamic nature of the grinding process, however, the zones may shift. In order to maintain the operating point within a stable zone, it is necessary to know the lobe precessions in these zones. The workpiece and wheel lobe precessions are shown in FIGS. 3A and B, respectively, for the 8/8 lobe pair for three unstable conditions, namely, $\alpha=0.1$, 10.0 and 13.08, as a function of wheel speed. FIG. 3C illustrates workpiece speed as a function of wheel speed for the same conditions.

Considering the $\alpha=0.1$ contour and FIG. 3C, the horizontal portions of the contour corresponding to wheel speeds between approximately 65.4 and 74.4 (at the top) and between approximately 60.5 and 69 (at the bottom) are speed ranges where wheel speed has little effect on stability. The sloping portions of the contour between wheel speeds of approximately 60.5 and 65.4 (at the left) and between approximately 69 and 74.4 (at the right) are ranges where the chatter is due to the combined effect of both the wheel and the workpiece. FIG. 3B shows that in these latter ranges the wheel lobe precession is approximately zero or $-2\pi$, and only small changes in wheel lobe precession exert a significant effect on the process. Accordingly, it is desirable to operate the wheel at speeds between approximately 65.4 and 69, as indicated by to the two vertical lines in the figures, and it is best to remain centered within this speed range by adjusting the wheel speed to maintain a wheel lobe precession equal to approximately $-1$ or $-5.5$ (see FIG. 3B) depending upon whether the instability is at the top or the bottom of the lobe pair contours. In either case, the magnitude of the wheel lobe precession can be increased by increasing wheel speed, and since stability is not greatly affected by wheel speed in this range, the exact speed is not too important.

Next, considering the workpiece speed, by noting the relative positions of the $\alpha=0.1$ and $\alpha=10.0$ contours, it is clear from the figures that if the workpiece lobe precession is less than about $-\pi/2$, one is at the top of the workpiece versus wheel speed contours, and stability may be improved by increasing workpiece speed which also increased the magnitude of the workpiece lobe precession. This may be continued until the bottom of the $\frac{7}{8}$ instability is approached (see FIG. 1). The bottom of the $\frac{7}{8}$ instability is like the bottom of the 8/8 instability in terms of lobe precession. The workpiece lobe precession increases in magnitude with workpiece speed until at $\Omega_W T_W = -0.9$, the $\alpha=0.1$ instability is reached. Accordingly, for optimum conditions, it is necessary to keep the 8/8 workpiece lobe precession more negative than $-2.4$ while keeping the $\frac{7}{8}$ lobe precession more positive than $-0.9$. Thus, regardless of the speed or lobe pair in question, if the measured workpiece lobe precession falls between $-2.4$ and $-0.9$, the workpiece speed should be modified up or down.

Control of the wheel and the workpiece speeds may be accomplished by control unit 44 continuously and automatically in response to the measured values of lobe precessions from the stability detectors 40 and 42. The speed control logic may be readily implemented in software, and control unit 44 may comprise a numerical control unit such as a General Electric series 1050 or 2000 control unit.

From the foregoing, it will be appreciated that the invention affords a highly advantageous method and apparatus for monitoring and optimizing a grinding process. The exponential chatter growth index may be easily determined from the wheel and workpiece lobe precessions and affords a very convenient parameter for monitoring the stability of the grinding process, and the process may be optimized by control of the wheel and workpiece speeds to minimize the chatter growth index. This affords better control over the tolerance of parts being machined and enables the maximum allowable grinding time between wheel dressings to be achieved.

While a preferred embodiment of the invention has been shown and described, it will be appreciated by those skilled in the art that changes may be made in this embodiment without departing from the principles and spirit of the invention, the scope of which is defined in the appended claims.

APPENDIX A

Equations for Doubly Regenerative Chatter Growth $$\omega^2 = \left[ \frac{1}{2mK_W q} + \left( Aq + \frac{2z^2}{z^2+1} \right) + \sqrt{\left( Aq + \frac{2z^2}{z^2+1} \right)^2 + \frac{4z^2}{(z^2+1)^2}} \right] \quad (A1)$$

$$\omega T_G = 2\pi n_G + \Omega_G T_G \quad (A2)$$

$$\omega T_W = 2\pi n_W + \Omega_W T_W \quad (A3)$$

$$q = 1 + \frac{\sinh \alpha T_W}{\cosh \alpha T_W - \cos \Omega_W T_W} + \frac{K_G}{K_W}\left[ \pm 1 + \frac{\sinh \alpha T_G}{\cosh \alpha T_G - \cos \Omega_G T_G} \right] \quad (A4)$$

$$0 = \frac{z \sin \Omega_W T_W + \cos \Omega_W T_W - e^{\alpha T_W}}{\cosh \alpha T_W - \cos \Omega_W T_W} + \frac{K_G}{K_W}\left[ \frac{z \sin \Omega_G T_G \pm \cos \Omega_G T_G \mp e^{\pm \alpha T_G}}{\cosh \alpha T_G - \cos \Omega_G T_G} \right] \quad (A5)$$

$$q = \frac{2z^2 \left[ -1 + \sqrt{1 + \frac{1}{z^2}\left( 1 + \frac{2A}{2mK_W \beta^2} \right)} \right]}{(z^2+1)(2mK_W \beta^2 + 2A)} \quad (A6)$$

Where:
- $a$ = $F_o/L_o$ cutting stability index (N/mm)
- $A$ = $K_W(k - c^2/4m)$, machine stiffness parameter
- $c$ = measured, known machine damping (N-s/mm)
- $e$ = 2.71828
- $F_o$ = initial grinding force or noise (N)
- $k$ = static machine stiffness (N/mm)
- $K$ = total effective cutting compliance at the grinding interface (mm/N)
- $K_G, K_W$ = linear wear coefficients (mm/N)
- $L_o$ = $L_G + L_W$ lobe noise factor (mm)
- $L_G, L_W$ = initial lobe amplitudes or noise (mm)
- $m$ = equivalent machine mass (N-s$^2$/mm)
- $n_G, n_W$ = integer numbers of lobes or waves
- $N_G, N_W$ = rotational speeds (rev/s)
- $q$ = $K/K_W$, cutting compliance quotant
- $t$ = time (s)
- $T_G, T_W$ = $1/N_G$, $1/N_W$, rotational periods (s)
- $z$ = $aK/2$, dimensionless cutting stability index
- $\alpha$ = exponential growth index (1/s)
- $\beta$ = $\alpha + c/2m$, reduced stability (1/s)
- $\Omega_G, \Omega_W$ = lobe precession rates (rad/s)

Subscripts:
- $G$ = grinding wheel
- $W$ = workpiece

In Equations (A4) and (A5) when terms contain dual signs, the upper sign corresponds to a climb cut and the lower sign to a normal cut.

APPENDIX B

The following FORTRAN program uses the bisection method to iterate $\Omega_W T_W$ and $\Omega_G T_G$ to solve Equations (A4) and (A5) (lines 0110 through 0600), and a third bisection iterates Z to complete the solution for a given $N_W$ and $\Omega_G T_G$ between 0 and $\pi$ (VW and OTG in the code, lines 0070 through 0100 and 0610 through 0720).

```
0002    DOUBLE PRECISION Z,PI,OTG1,OTG2,OTG,
        C5,CR,
0004    & C1,C2,C3,C4,B,A,Y,UK,VK,Q1,Q2,Q3,Q,AQ,
        UK1,RAD,
0006    & ATG,XG1,OTW1,OTW2,OTW,ATW,XW1,
        DELX,QRG,QRW,QR,
0008    & DELQ,W,R,VW,VNG,VNW,
0010    READ,A
0020    READ,NW
0030    READ,NG
0035    Z=.4
0040    DO 5 J=1,100
0042    READ,VW
0043    PRINT 150,VW
0044    Z1=-.3
0046    Z2=Z
0050    N2=0
0060    PI=4.*DATAN(1.)
0070  7 OTG1=0.
0080    OTG2=-PI
0090    N1=0
0095    N2=N2+1
0097    IF (N2.GT.30) GO TO 5
0100    Z=(Z1+Z2)/2.
0110 10 OTG=(OTG1+OTG2)/2.
0150    C1=534.653466/VW
0160    C2=.940563/VW
0170    C3=0.0001208/VW
0180    C4=124.98962
0183    C5=.00006/VW
0186    CR=.01
0190    B=A+C4
0200    Y=Z*Z+1.
0210    UK=-2.*Z*Z/Y
0220    VK=-2.*Z/Y
0230    Q1=-UK
```

APPENDIX B-continued

The following FORTRAN program uses the bisection method to iterate $\Omega_W T_W$ and $\Omega_G T_G$ to solve Equations (A4) and (A5) (lines 0110 through 0600), and a third bisection iterates Z to complete the solution for a given $N_W$ and $\Omega_G T_G$ between 0 and $\pi$ (VW and OTG in the code, lines 0070 through 0100 and 0610 through 0720).

```
0240        Q2=2.*(C1-C2)/(C3*B*B)
0250        Q3=DSQRT(1.+(1.+Q2)/(Z*Z))
0260        Q=Q1*(-1.+Q3)/(C3*B*B+2.*(C1-C2))
0270        AQ=Q*(C1-C2)
0280        UK1=AQ=UK
0290        RAD=DSQRT(UK1*UK1+VK*VK)
0300        W=DSQRT((RAD+UK1)/(C3*Q))
0310        R=A/W
0320        ATG=R*(2.*PI*NG+OTG)
0330        XG1=(Z*DSIN(OTG)+DCOS(OTG)-DEXP
             (ATG))/(DCOSH(ATG)-DCOS(OTG))
0340        OTW1=0
0350        OTW2=-2.*PI
0360    40  OTW=(OTW1+OTW2)/2.
0370        ATW=R*(2.*PI*NW+OTW)
0380        XW1=(Z*DSIN(OTW)+DCOS(OTW)-DEXP
             (ATW))/(DCOSH(ATW)-DCOS(OTW))
0390        DELX=XW1+CR*XG1
0400        IF (DELX.GT.0.00000001) GO TO 50
0410        IF (DELX.LT.-0.00000001) GO TO 60
0420        GO TO 70
0430    50  OTW1=OTW
0440        GO TO 40
0450    60  OTW2=OTW
0460        GO TO 40
0470    70  CONTINUE
0480        QRG=DSINH(ATG)/(DCOSH(ATG)-DCOS
             (OTG))
0490        QRW=DSINH(ATW)/(DCOSH(ATW)-DCOS
             (OTW))
0500        QR=CR*(1.+QRG)+.1+QRW
0510        DELQ=QR-Q
0515        N1=N1+1
0520        IF (N1.GT.50) GO TO 120
0530        IF (DELQ.GT.0.00000001) GO TO 80
0540        IF (DELQ.LT.-0.00000001) GO TO 90
0550        GO TO 100
0560    80  OTG1=OTG
0570        GO TO 10
0580    90  OTG2=OTG
0590        GO TO 10
0600   100  VNG=W/(2.*PI*NG+OTG)
0610        VNW=W/(2.*PI*NW+OTW)
0620        DELV=VNW-VW
0650        IF (DELV.GT.0.00001) GO TO 110
0660        IF (DELV.LT.-0.00001) GO TO 120
0670        GO TO 130
0680   110  Z2=Z
0690        GO TO 7
0700   120  Z1=Z
0710        GO TO 7
0720   130  CONTINUE
0730        PRINT 150,OTG,OTW,VNG,VNW
0732        AG=SQRT(EXP(2.*ATG)-2.*EXP(ATG)*COS
             (OTG)+1.)/(COSH(ATG)-COS(OTG))
0734        AFG=ALOG(C5*CR*AG/2.)
0736        AW=SQRT(EXP(2.*ATW)-2.*EXP(ATW)*COS
             (OTW)+1.)/(COSH(ATW)-COS(OTW))
0738        AFW=ALOG(C5*AW/2.)
0740        PRINT 160,Q,W,Z,AFG,AFW
0742   150  FORMAT (1X,4(1PG11.4,2X))
0746   160  FORMAT (1X,5(1PG11.4,2X))
0750        PRINT,
0760     5  CONTINUE
0770        STOP
0780        END
```

*LIST QUAD3C

What I claim as new and desire to secure by Letters Patent of the United States is:

1. Apparatus for optimizing a grinding process which includes a rotating grinding wheel and a rotating workpiece, the apparatus comprising first means for measuring a wheel lobe precession parameter representative of the precession of lobes about the grinding wheel; second means for measuring a workpiece lobe precession parameter representative of the precession of lobes about the workpiece; and third means responsive to the measured lobe precession parameters for determining a chatter growth index representative of the rate of chatter growth in the grinding process.

2. The apparatus of claim 1 wherein the first means comprises means for measuring the grinding wheel speed and for producing a first signal representative of grinding wheel speed, means for measuring the frequency of vibrations associated with the grinding process and for producing a second signal representative of the vibration frequency, and means for processing the first and second signals to produce a signal representative of the wheel lobe precession parameter.

3. The apparatus of claim 2, wherein the second means comprises means for measuring the rotational speed of the workpiece and for producing a third signal representative of the workpiece rotational speed, and means for processing the second and third signals to produce another signal representative of the workpiece lobe precession parameter.

4. The apparatus of claim 3, wherein said wheel speed measuring means and said workpiece speed measuring means each comprise a tachometer generator which produces an output frequency corresponding to the rotational speed of the wheel and the workpiece, respectively, the output frequencies of the tachometer generators of the first and second means corresponding, respectively, to the first and third signals, and wherein each processing means comprises a frequency multiplier for multiplying the output frequency from its associated tachometer generator by an integer number to produce a multiplied frequency, means for multiplying the multiplied frequency by the second signal to produce a multiplied signal, filter means for filtering the multiplied signal to produce a filtered signal, frequency measuring means for measuring the frequency of the filtered signal to produce a measured frequency signal, and means for multiplying the measured frequency signal by a parameter corresponding to the period of the output frequency of the tachometer generator to produce said lobe precession parameter.

5. The apparatus of claim 4, wherein said filter means comprises a low pass filter having a cutoff frequency of the order of $2\pi N$, where N is the speed in revolutions per second.

6. The apparatus of claim 4, wherein the frequency multiplier is adjustable so that said integer number can be varied.

7. The apparatus of claim 4, wherein each processing means comprises digital hardware.

8. The apparatus of claim 1, wherein said third means comprises means for storing values of chatter growth index corresponding to different values of wheel lobe precession and workpiece lobe precession parameters, and means for selecting a value of chatter growth index corresponding to the measured wheel lobe precession parameter and the measured workpiece lobe precession parameter.

9. The apparatus of claim 1, further comprising means responsive to the determined chatter growth index for controlling individually the rotational speeds of the wheel and the workpiece so as to minimize chatter.

10. The apparatus of claim 9, wherein said controlling means comprises a numerical control system.

11. Method of optimizing a grinding process in which a rotating grinding wheel engages a rotating workpiece, the method comprising measuring a wheel lobe precession parameter representative of the precession of lobes about the grinding wheel; measuring a workpiece lobe precession parameter representative of the precession of lobes about the workpiece; and determining from the measured lobe precession parameters a chatter growth index representative of the rate of chatter growth in the grinding process.

12. The method of claim 11, wherein said wheel lobe precession and said workpiece lobe precession measuring steps comprise measuring the rotational speeds of the wheel and the workpiece, respectively, and generating first and second signals having frequencies corresponding to the measured rotational speeds of the wheel and the workpiece, measuring the frequency of the vibrations produced by the grinding process and generating a third signal, multiplying the third signal by each of the first and second signals to produce a multiplied wheel signal and a multiplied workpiece signal, filtering the multiplied signals, measuring the frequencies of the filtered signals to produce corresponding signals representative of the wheel lobe precession frequency and the workpiece lobe precession frequency, and multiplying said signals representative of wheel lobe precession frequency and workpiece precession frequency by factors related to wheel and workpiece speeds, respectively, to generate output signals corresponding to the wheel lobe precession and the workpiece lobe precession parameters.

13. The method of claim 12, wherein said determining step comprises storing values of chatter growth index corresponding to different values of wheel lobe precession and workpiece lobe precession, and selecting a value of chatter growth index based upon the measured values of the wheel lobe precession and the workpiece lobe precession parameters.

14. The method of claim 13 further comprising controlling the speeds of the wheel and the workpiece so as to minimize chatter.

15. The method of claim 14, wherein said controlling comprises controlling the wheel speed so as to maintain the value of the wheel lobe precession within either of first and second predetermined ranges of values, and controlling the workpiece speed so as to maintain the workpiece lobe precession within either of third and fourth predetermined ranges of values.

16. The method of claim 15, wherein said controlling comprises controlling the wheel and workpiece speeds so as to minimize the value of the chatter growth index.

17. Method for optimizing a grinding process in which a rotating grinding wheel engages a rotating workpiece, the method comprising measuring a wheel lobe precession parameter representative of the precession of lobes about the wheel; measuring a workpiece lobe precession parameter representative of the precession of lobes about the workpiece; and controlling the rotational speeds of the wheel and the workpiece in response to the measured lobe precession parameters to minimize chatter in the grinding process.

18. The method of claim 17, wherein said controlling comprises defining contours representative of chatter growth rate as a function of wheel and workpiece lobe precession parameter values, storing said contours, and controlling the wheel and workpiece speeds to minimize the chatter growth rate.

19. The method of claim 18, wherein said controlling comprises selecting the speeds so as to maintain the wheel and workpiece lobe precessions within predetermined ranges of values.

20. The method of claim 19, wherein said measuring comprises measuring the lobe precession parameters for a predetermined number of wheel lobes and a predetermined number of workpiece lobes, and said defining comprises defining contours of chatter growth rate for a plurality of different pairs of wheel lobe and workpiece lobe numbers.

* * * * *